UNITED STATES PATENT OFFICE 2,608,556

PREPARATION OF A SOLUBLE METAL QUINOLINOLATE

Victor N. Kalberg, Chicago, Ill., assignor to Scientific Oil Compounding Company, Inc., a corporation of Illinois No Drawing. Application July 10, 1950, Serial No. 173,013

18 Claims. (Cl. 260—270)

1

This invention relates to so-called permanent fungicidal and/or fungistatic compounds or compositions and to methods of making the same.

The compounds of the present invention are formed by reacting a phenol with a water-insoluble metal quinolinolate. The proportions of the reactants may be varied widely, as desired. They may be stoichiometrical proportions, but it is preferred that a substantial molar excess of the phenol be used. A molar excess of the water-insoluble metal quinolinolate may be used, but this is not desirable. The reaction temperature may also be varied widely, as desired, from room temperature or even below up to the lowest decomposition temperature of the reactants. It is preferred to carry out the reaction at an elevated temperature at about the melting point of the phenol where the phenol is normally a solid at 70° F., and at or a little below the boiling point of the phenol where the phenol is normally a liquid at 70° F.

The compounds of the present invention are capable of being dissolved or dispersed readily in one or more of the common organic solvents such as benzol, toluol, methanol and acetone, and in oils and oily materials such as vegetable oils, fish oils, and mineral oils, molten rosin, and the saturated and unsaturated higher aliphatic acids containing from eight to eighteen carbon atoms, or in a mixture of such materials. The resulting solutions or dispersions have usefulness as fungicidal and/or fungistatic sprays, impregnants and coatings in the treatment of canvas, webbing, threads, yarns, rope, cord, wood, paper, leather, resins, and the like. The compounds of the present invention may be incorporated in varnishes, sealers, lacquers, paints, and the like, and the resulting products are thereby made fungus-resistant. Phenol-aldehyde resins, urea-aldehyde resins, melamine-aldehyde resins, polymerizable polyester resins, alkyds including unsaturated alkyd resins, vinyl resins, polyethylene resins as well as other resins, may have incorporated therewith during compounding the compounds of the present invention and thereby these resins are made fungus-resistant. Low and high melting-point mineral and synthetic waxes and greases are made fungus-resistant by dissolving or dispersing therein the compounds of the present invention.

The water-insoluble metal quinolinolate reactant may be an alkaline earth metal salt, a heavy metal salt, or an aluminum, tin or beryllium salt of an hydroxyquinoline having the phenolic hydroxy group located in any position in the benzene nucleus or the nitrogen ring of the quinoline radical, or in more than one such position. Examples of these salts are the calcium, barium, magnesium, beryllium, lead, mercury, manganese, cobalt, nickel, iron, copper, cadmium, silver, thallium, tin, zinc and aluminum salts of 2-hydroxyquinoline, 4-methyl-2-hydroxyquinoline, 4-hydroxyquinoline, 2-methyl-4-hydroxyquinoline, 5-hydroxyquinoline, 6-hydroxyquinoline, 7-hydroxyquinoline and 8-hydroxyquinoline. The preferred compounds of the present invention are the products formed by reacting a phenol with a heavy metal salt, particularly a copper salt, of 8-hydroxyquinoline. Examples of these salts are copper-8-quinolinolate, copper 5,7-dichloro-8-quinolinolate and copper 5,7-dibromo-8-quinolinolate.

Of the water-insoluble metal quinolinolate reactants which may be used copper-8-quinolinolate is preferred because it is commercially available and because it reacts readily with a phenol to produce compounds in accordance with the present invention having superior fungicidal and/or fungistatic properties. These new compounds are soluble to more or less of an extent in oils, oily materials, benzol, toluol, petroleum thinners and mineral spirits and like organic solvents or thinners commonly used in the coating art, or in mixtures of such materials, whereas copper-8-quinolinolate is characterized by its insolubility in these materials. Dispersions of these new compounds in water are more stable than are corresponding dispersions of copper-8-quinolinolate.

Any phenol may be used as a reactant in accordance with the present invention but I prefer to use a phenol of the general formula

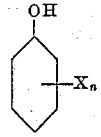

wherein X represents the following radicals: H, OH, CHO, NO$_2$, Cl., Br., alkyl, aryl, alkaryl, aralkyl, CONH$_2$, COOR and OR' and n represents an integer, 1 to 5; and wherein the R of the radical COOR represents H, alkyl and aryl, and the R' of the radical OR' represents alkyl and aryl. The X substituents may be alike or dissimilar, as desired. Examples of phenol compounds falling within the ambit of this general formula are phenol, ortho amyl phenol, para cresol, ortho cresol, meta cresol, para chloro meta cresol, tertiary butyl meta cresol, para nitro phenol, salicylaldehyde, salicylamide, ortho cyclohexyl phenol, resorcinol, pyrogallol, 2,4-dichlorophenol, pentachlorophenol, picric acid, thymol (5-methyl-2-isopropyl phenol), 2,3,4,6-tetrachlorophenol, tetrachloro hydroquinone, 6-tertiary-butyl-3-methyphenol, xylenol, chloroxylenol, 4-phenyl phenol, 2,4,6-tribromophenol, para tolyl phenol, xylyl phenol, phenyl salicylate, para hydroxy propiophenone, methyl salicylate, 2,2'-dihydroxy - 5,5' - dichlorodiphenylmethane (G-4), and any mixture thereof. The G-4 compound is also known as bis(5-chloro-2-hydroxyphenyl)methane.

The following are illustrative examples of methods of preparing the reaction products of the present invention. The reaction, in each instance, was carried out in a glass (Pyrex) reaction vessel with constant stirring of the reactants; however, it may be carried out in a reaction vessel made of stainless steel or other non-corrodible material. In these examples the term "part" refers to parts by weight.

Example 1

100 parts of salicylamide were heated to 300° F. and 11 parts of copper-8-quinolinolate were then added with stirring. The mixture was then further heated to 320° F., resulting in complete solution. 10 parts of the resulting reaction product were then dissolved in a solvent mixture consisting of 60 parts toluol, 20 parts methanol and 10 parts morpholine and the solution was used to impregnate duck samples which were then tested as follows.

Samples of 10 oz. specification army duck were cut into 6" x 30" pieces and the pieces were washed in soap suds, rinsed thoroughly and dried. One piece was submerged at room temperature in the above 10% solution of the reaction product and passed through a set of rubber squeeze rollers to remove the excess of impregnating solution. Approximately a 50% wet-pickup was obtained and the impregnated fabric was then air-dried at room temperature for 48 hours to insure substantially complete solvent release.

The impregnated and dried piece of duck was buried in a well composted soil consisting of 50% black loam and 50% pre-rotted manure, horizontally one inch beneath the surface of the soil for 14 days. A similar piece of untreated duck which was used as a control was similarly buried. During this period the soil temperature was maintained at approximately 80° F. with approximately 30% moisture content.

Prior to impregnating the piece of duck with the solution of Example 1, it and the untreated piece of duck were tested for tensile strengths on a 400 lb. vertical Scott tester. Each had a tensile strength of 212 lbs. After the 14-day burial period the treated duck and the control piece were removed from the soil, washed thoroughly in warm water to remove all soil particles and air-dried at room temperature. Tensile strength on the treated piece was then taken on the same Scott tester. It had a tensile strength of 223 lbs. The control piece was removed from the soil in small deteriorated pieces which had lost their fabric strength and hence were not tested. Each of these small pieces was badly stained. In contrast the treated piece was substantially free from stain.

Example 2

90 parts by weight of ortho amyl phenol were heated to 150° F. 10 parts of copper-8-quinolinolate were added with stirring. A clear solution resulted. On cooling this solution became a semi-liquid mass which was soluble in toluol, benzol, methanol and acetone.

10 parts by weight of the reaction product were dissolved in 90 parts of xylol and a piece of duck similar to that in Example 1 was impregnated with this solution and further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 3

85 parts by weight of para chloro meta cresol were melted and heated to 125 to 150° F. 15 parts of copper-8-quinolinolate were added with stirring. A clear solution resulted. The solution solidified on cooling to room temperature. The solid dissolved readily in toluol, benzol, methanol and acetone, and in mixtures of these solvents.

10 parts by weight of the reaction product were dissolved in 90 parts of acetone and a piece of duck similar to that in Example 1 was impregnated with this solution and further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 4

90 parts by weight of para nitro phenol were melted by heating to 260° F. 10 parts of copper-8-quinolinolate were added with stirring to the molten mass, sufficient heat being supplied to maintain in the melt a temperature of 250 to 275° F. The melt solidified on curing. The resulting solid dissolved to an extent slightly less than 2% in toluol, benzol, methanol and acetone.

A 1.5% solution of the reaction product of this example in toluol was prepared and a piece of duck similar to that of Example 1 was impregnated with this solution and further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 5

80 parts of 2,4-dichlorophenol were melted and heated to 150° F. 20 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in benzol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 6*

90 parts of phenol were melted and heated to 150° F. 10 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in toluol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 7*

85 parts of pentachlorophenol were melted and heated to 375° F. 15 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in benzol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 8*

85 parts of resorcinol were melted and heated to 250° F. 15 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in methanol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 9*

90 parts of 4-phenyl phenol were melted and heated to 325° F. 10 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in acetone and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 10*

85 parts of thymol (5-methyl-2-isopropyl phenol) were melted and heated to 150° F. 15 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in toluol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 11*

85 parts of 2-4-6 tribromophenol were melted and heated to 225° F. 15 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in benzol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

*Example 12*

95 parts of pyrogallol were melted and heated to 285° F. 5 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in methanol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 13

90 parts of para hydroxy propiophenone were melted and heated to 285° F. 10 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in toluol and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 14

95 parts of para tolyl phenol were melted and heated to 325° F. 5 parts of copper-8-quinolinolate were added with stirring, resulting in complete solution which solidified on cooling to room temperature. The solid was soluble in toluol, benzol, methanol and acetone.

A piece of duck similar to that in Example 1 was impregnated with a 10% solution of the reaction product of this example in acetone and the impregnated piece of duck was further treated and buried in soil along with a control piece, all as described in Example 1.

The duck specimen treated with the treating solution of this example showed slight to no evidence of microorganism attack and showed no loss of fabric strength. The control specimen was removed from the soil in small pieces, badly stained and with complete loss of fabric strength.

Example 15

85 parts of nonyl phenol were heated to 175° F. and 15 parts of copper-8-quinolinolate were then added with stirring, resulting in complete solution which remained liquid on cooling to room temperature. The liquid reaction product was soluble in toluol, benzol, methanol and acetone.

A piece of duck similar to that in Example 1 was impregnated with a 10% solution of the reaction product of this example in toluol and the impregnated piece of duck was further treated and buried in soil along with a control piece, all as described in Example 1.

The duck specimen treated with the treating solution of this example showed slight to no evidence of micro-organism attack and showed no loss of fabric strength. The control specimen was removed from the soil in small pieces, badly stained and with complete loss of fabric strength.

Example 16

95 parts of methyl salicylate were heated to 260° F. and 5 parts of copper-8-quinolinolate were then added with stirring, resulting in complete solution which remained liquid on cooling to room temperature. The liquid reaction product was soluble in toluol, benzol, methanol and acetone.

A piece of duck similar to that in Example 1 was impregnated with a 10% solution of the reaction product of this example in toluol and the impregnated piece of duck was further treated and buried in soil along with a control piece, all as described in Example 1.

The duck specimen treated with the treating solution of this example showed slight to no evidence of micro-organism attack and showed no loss of fabric strength. The control specimen was removed from the soil in small pieces, badly stained and with complete loss of fabric strength.

The reaction products of each of Examples 1 to 16, inclusive, in the form of the solutions described, were individually applied to wood samples 1" x 3" and leather squares 2" x 2" by soaking under vacuum for 20 minutes and drying for 6 hours. The treated specimens and untreated control specimens of similar dimensions were placed on a sterile nutrient agar medium with a pH of 5.5, which was used for the substratum in the petri dishes in which the specimens were placed. Each treated specimen and a control specimen were placed in a single petri dish. The specimens in each of these dishes were sprayed with a spore suspension of the following organisms and incubated at 30° C. for 14 days: Chaetomium globosum, Penicillium citrinum, Aspergillus niger, Aspergillus ferreus, Trichoderma viride, and Aspergillus flavus.

At the conclusion of this test period it was found that fungi were growing over the entire surface of the leather and wood control specimens and that no growth existed on the treated wood and leather specimens.

The reaction products of the present invention can be used to treat textiles, paper, leather and the like by impregnating or coating these materials with a solution or dispersion of the reaction product in a suitable vehicle. Thus, the solutions described above may be used to treat these materials. These solutions may be compounded with resins, animal, vegetable and fish oils, plasticizers, driers, anti-oxidants and the like, in accordance with known techniques, to impart to the solutions desired properties. For example, characteristics such as spread and flow of these solutions may be modified by the addition thereto of a fatty acid such as lauric acid, oleic acid, linseed oil fatty acids, hempseed oil fatty acids and like fatty acids having from 8 to 20 carbon atoms in the chain, and of a fatty acid glyceride, either raw or treated, such as raw or bodied linseed oil, China wood oil, castor oil, dehydrated castor oil, and the like. Compatible natural and synthetic resins such as rosin, phenol-aldehyde resins, urea-aldehyde resins, vinyl resins and the like, or compatible cellulose derivatives such as nitrocellulose, cellulose acetate, ethyl cellulose and the like may be incorporated in the solutions in varying proportions to meet any desired needs.

Plasticizers such as glycol, glycerine, pentaerythritol, sorbitol, mannitol and other compatible plasticizers may be added to the solutions. Suitable anti-oxidants which may be added to the solution are phenyl salicylate, tertiary butyl catechol and guaiacol, and suitable driers are zinc naphthenate, lead naphthenate, cobalt naphthenate and zinc octoate.

If it is desired to impart water-proof properties to the solutions of the reaction products of the present invention, various waxes such as paraffin wax, bees wax, carnauba wax, spermaceti wax, synthetic waxes, and the like, may be incorporated in the solutions in varying proportions to meet the desired needs.

By a proper choice of the solvents for the reaction products of the present invention and of suitable modifying agents, the resulting liquid compositions may be controlled as to consistency, drying time, flow, penetration, and the like.

The reaction products of the present invention need not be used in solution or dispersion form but may be incorporated directly in resins, greases, waxes and similar compositions by compounding these reaction products with other constituents of the compositions in accordance with known techniques. Better distribution of the reaction products in these compositions are obtained if the reaction products are dissolved or dispersed in a suitable vehicle.

Compositions containing reaction products of the present invention not only inhibit the growth of fungus organisms but may also kill the activity of all existing fungus growth on contact. Textiles, leather, wood, resins, etc., which have been treated with the reaction products of the present invention are not attacked to any appreciable extent by soil animal life and these treated materials resist the action of bacteria and insects. The reaction products of the present invention lend themselves for use as insecticides, in either dry or liquid form, and for preventing and combating diseases of plant life, both those diseases which attack the parts of plants above ground and diseases such as rot which attack underground parts of the plants.

While the present invention has been described in connection with certain specific examples of methods of making the reaction products, it is obvious that my invention is not to be construed as limited to the specific materials disclosed in these examples or to the details of the methods set forth therein, since changes in materials, proportions and method details may be made without departing from the scope of my invention as defined in the appended claims.

I claim:

1. The method of making a material having fungicidal properties comprising maintaining a mixture of a phenol and water-insoluble metal quinolinolate at a temperature below the lowest decomposition temperature of the said phenol and quinolinolate until the quinolinolate dissolves in the phenol.

2. The product formed by the method of claim 1.

3. The method of making a material having fungicidal properties comprising maintaining a mixture of a phenol and a water-insoluble metal 8-quinolinolate at a temperature below the lowest decomposition temperature of the said phenol and quinolinolate until the quinolinolate dissolves in the phenol.

4. The product formed by the method of claim 3.

5. The method of making a material having fungicidal properties comprising maintaining a mixture of a phenol and a water-insoluble heavy metal 8-quinolinolate at a temperature below the lowest decomposition temperature of the said phenol and quinolinolate until the quinolinolate dissolves in the phenol.

6. The product formed by the method of claim 5.

7. The method of making a material having fungicidal properties comprising maintaining a mixture of a phenol and copper 8-quinolinolate at a temperature below the lowest decomposition temperature of the said phenol and qinolinolate until the quinolinolate dissolves in the phenol.

8. The product formed by the method of claim 7.

9. The method of making a material having fungicidal properties comprising maintaining a mixture of phenol and copper 8-quinolinolate at a temperature below the lowest decomposition temperature of the said phenol and quinolinolate until the quinolinolate dissolves in the phenol.

10. The product formed by the method of claim 9.

11. The method of making a material having fungicidal properties comprising maintaining a mixture of nonyl phenol and copper 8-quinolinolate at a temperature below the lowest decomposition temperature of the said phenol and quinolinolate until the quinolinolate dissolves in the phenol.

12. The product formed by the method of claim 11.

13. The method of making a material having fungicidal properties comprising maintaining a mixture of ortho amyl phenol and copper 8-quinolinolate at a temperature below the lowest decomposition temperature of the said phenol and quinolinolate until the quinolinolate dissolves in the phenol.

14. The product formed by the method of claim 13.

15. The method of making a material having fungicidal properties comprising maintaining a mixture of salicylamide and copper 8-quinolinolate at a temperature below the lowest decomposition temperature of the said phenol and quinolinolate until the quinolinolate dissolves in the phenol.

16. The product formed by the method of claim 15.

17. The method of making a material having fungicidal properties comprising maintaining a mixture of 2,4-dichlorophenol and copper 8-quinolinolate at a temperature below the lowest decomposition temperature of the said phenol and quinolinolate until the quinolinolate dissolves in the phenol.

18. The product formed by the method of claim 17.

VICTOR N. KALBERG.

No references cited.